US007529914B2

(12) United States Patent
Saha et al.

(10) Patent No.: US 7,529,914 B2
(45) Date of Patent: May 5, 2009

(54) METHOD AND APPARATUS FOR SPECULATIVE EXECUTION OF UNCONTENDED LOCK INSTRUCTIONS

(75) Inventors: Bratin Saha, San Jose, CA (US); Matthew C. Merten, Hillsboro, OR (US); Per Hammarlund, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 574 days.

(21) Appl. No.: 10/883,519

(22) Filed: Jun. 30, 2004

(65) Prior Publication Data

US 2006/0004998 A1    Jan. 5, 2006

(51) Int. Cl.
*G06F 7/38* (2006.01)
*G06F 9/00* (2006.01)
*G06F 9/44* (2006.01)
*G06F 15/00* (2006.01)

(52) U.S. Cl. ........................ 712/220; 712/233; 712/239; 712/243; 712/208

(58) Field of Classification Search ................. 712/233, 712/220
See application file for complete search history.

(56) References Cited

U.S. PATENT DOCUMENTS 6,611,900 B2 *  8/2003  Patel et al. .................. 711/145
6,615,340 B1 *  9/2003  Wilmot, II .................. 712/209
6,665,792 B1   12/2003  Merchant et al.

2002/0046334 A1   4/2002  Wah Chan et al.
2003/0145136 A1 *  7/2003  Tierney et al. .................. 710/3

FOREIGN PATENT DOCUMENTS

WO    WO 01/77820 A2    10/2001

OTHER PUBLICATIONS

Rajwar et al., Speculative Lock Elision: Enabling Highly Concurrent Multithreaded Execution, Dec. 2001.*
Intel Corporation, "IA-32 Intel Architecture Developer's Manual—vol. 3: System Programming Guide", Order No. 253668, pp. 7-1 to 7-46, 2004.
PCT Int'l. Search Report and Written Opinion, Int'l. Application No. PCT/US2005/021838, Int'l. filing date Jun. 17, 2005, mailing date Feb. 27, 2006 (19 pp.).
Ravi Rajwar, et al., "Speculative Lock Elision: Enabling Highly Concurrent Multithreaded Execution", Microarchitecture, Micro-34 Symposium, Dec. 1-5, 2001 (pp. 294-305), Piscataway, NJ, USA, IEEE, Dec. 1, 2001.

* cited by examiner

*Primary Examiner*—Alford Kindred
*Assistant Examiner*—Jesse R Moll
(74) *Attorney, Agent, or Firm*—Blakely, Sokoloff, Taylor & Zafman LLP (57) ABSTRACT

A method and apparatus for executing lock instructions speculatively in an out-of-order processor are disclosed. In one embodiment, a prediction is made whether a given lock instruction will actually be contended. If not, then the lock instruction may be treated as having a normal load micro-operation which may be speculatively executed. Monitor logic may look for indications that the lock instruction is actually contended. If no such indications are found, the speculative load micro-operation and other micro-operations corresponding to the lock instruction may retire. However, if such indications are in fact found, the lock instruction may be restarted, and the prediction mechanism may be updated.

31 Claims, 6 Drawing Sheets

METHOD AND APPARATUS FOR SPECULATIVE EXECUTION OF UNCONTENDED LOCK INSTRUCTIONS

FIELD

The present disclosure relates generally to microprocessors that employ memory locking instructions (atomic read-modify-write to memory), and more specifically to microprocessors wishing to employ memory locking instructions that may be executed in an out-of-order execution architecture.

BACKGROUND

Modern microprocessors may support the use of out-of-order execution in their architectures. Individual instructions may each be decoded into a set of corresponding micro-operations, which then may be stored in a re-order buffer prior to execution. A scheduler may determine which micro-operations are actually ready to execute, and may issue the micro-operations other than in strict program order, or "out-of-order". When the micro-operations are ready for retirement, they may be retired in program order and will hence have the appearance of being executed in program order.

One family of instructions which have posed a problem in previous out-of-order processors is the lock instruction family. The lock instructions generally assert a signal or employ some procedure that performs an atomic memory transaction, that is, it locks a particular location in memory to prevent other processors, or other threads on the same processor, from accessing the memory location (or equivalent cache line) used during the constituent load and store micro-operations. In differing embodiments, the signal may include a bus signal or a cache-coherency protocol lock. Specific implementations of the lock instructions have necessitated that all previous instructions (in program order) have retired before the lock instructions start to execute. The load and store micro-operations of the lock instruction are generally delayed so that they may execute and retire as close together as possible to limit the time the processor must protect the memory address or cache line used by the lock instruction. However this prevents the load micro-operation and any other intervening micro-operations from speculatively executing, and therefore adds their latency to the critical path of the program. Specific implementations may also prevent subsequent load operations, or other subsequent operations, from speculatively executing, thus increasing the latency of the subsequent operations. In practice this may mean that any re-order buffer used to support out-of-order processing may fill and stall the pipeline, causing the application performance to degrade further.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The following description describes techniques for permitting out-of-order execution of lock instructions, which is beneficial when those lock instructions are not contended. It may be said that a lock instruction was contended when more than one processor, or more than one thread in the same processor, tried to lock the same location in memory essentially simultaneously. Lock instructions may be treated as contended when another processor, or another thread in the same processor, even tries to access the location in memory locked by another processor or thread. This is because it may not be possible to determine whether the other processor's (or other thread's) memory access is a lock attempt or merely a simple memory access. In the following description, numerous specific details such as logic implementations, software module allocation, bus and other interface signaling techniques, and details of operation are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation. In certain embodiments the invention is disclosed in the form of predicting qualifying predicate values for Pentium® compatible processor such as those produced by Intel® Corporation. However, the invention may be practiced in other kinds of processors, such as an Itanium Processor Family compatible processor or an X-Scale® family compatible processor, that may wish to execute instructions out-of-order.

Figure 1:
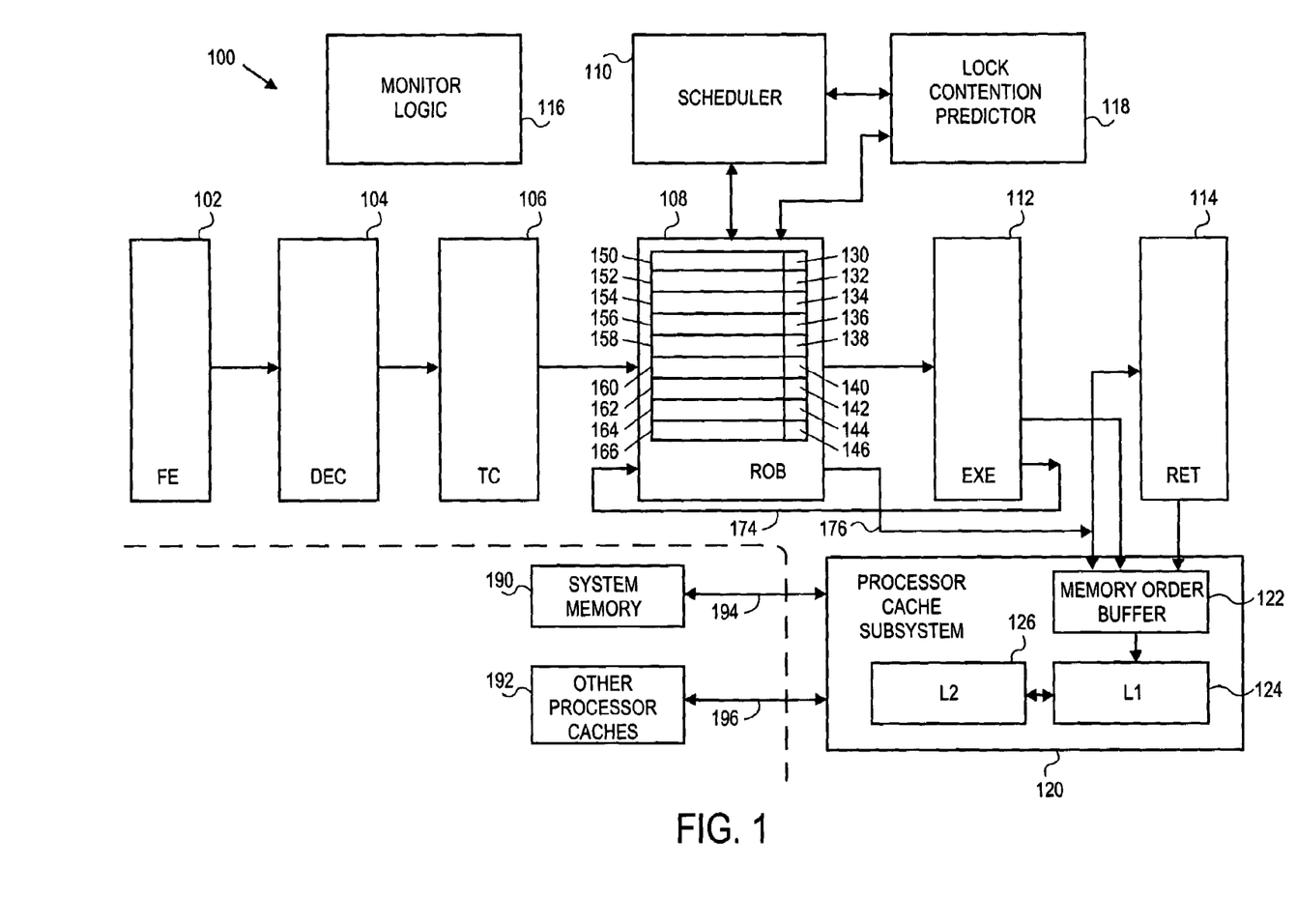
FIG. 1 is a schematic diagram of a processor and its execution pipeline showing a lock contention predictor operating near the end of the pipeline, according to one embodiment.

Referring now to FIG. 1, a schematic diagram of a processor 100 and its execution pipeline showing a lock contention predictor operating near the end of the pipeline is shown, according to one embodiment. In the FIG. 1 embodiment, a front-end stage 102, decode stage 104, trace cache 106, re-order buffer (ROB) 108, execution stage 112, and retirement stage 114 are shown. In other embodiments, other stages may be used in the pipeline, and the ordering of the stages may vary.

Macro instructions may be fetched from a level one (L1) cache 124 by the front-end stage 102, and decoded into a corresponding set of micro-operations by decoder stage 104. These sets of micro-operations may be stored in the form of traces in a trace cache 106. In other embodiments, the traces may be stored in another form of buffer. In yet further embodiments, the sets of micro-operations may be stored in other forms of buffers and not in the form of traces. When the set of micro-operations is prepared for execution, it may be loaded into the ROB 108. The ROB 108 may include a series of storage locations 150 through 166, each of which may contain a micro-operation, its source and destination registers' identification, and execution results when available. In other embodiments, differing numbers of storage locations may be provided, and the exact format of the contents of the storage locations may be different.

A scheduler 110 may be used to determine which of the micro-operations in the storage locations 150-166 have their source operand values available, thus permitting execution. In one embodiment, the scheduler 110 may examine the status of the source registers for each micro-operation in storage locations 150-166. The scheduler 110 may then issue those micro-operations whose source registers contain valid data for execution (in the execution stage 112) regardless of their order in the written software (i.e. potentially "out of order"). Any results from the execution of such micro-operations may then be temporarily stored as execution results in the corresponding storage location.

Each of the storage locations 150 through 166 may have an associated "completed" bit 130 through 146 that may indicate that the corresponding micro-operation has completed execution and that the result from the execution is temporarily stored as execution result in the corresponding storage location 150-166. In one embodiment the completed bits 130-146 may therefore indicate that the corresponding micro-operation is ready for retirement once micro-operations corresponding to previous instructions (in program order) have retired. (Micro-operations produced from macro instructions must still retire in original program order.) Micro-operations that are ready for retirement may be sent to a retirement stage 114. Micro-operations that invoke memory references may also be placed into a memory order buffer (MOB) 122. The MOB 122 may store several pending memory reference operations.

The processor of FIG. 1 may be capable of executing lock instructions. One form of lock instruction may prevent other processors, or other threads in a multi-threaded processor, from accessing a given memory location or cache line while the processor performs an operation on the memory location being locked. In effect, while the instruction is executing this "locks" the particular memory location or cache line to prevent other's access. Another viewpoint may be that this form of locking permits the instruction to atomically modify (often referred to in the literature as an atomic read-modify-write instruction) the particular memory location or cache line. In contrast, these locking instructions may be used as software semaphores to semantically lock other memory locations over extended numbers of instructions: these extended numbers of instructions are often referred to in the literature as a critical section. In one embodiment, the lock instruction may be implemented as a lock prefix appended to an ordinary instruction. In the Pentium® compatible architecture, the lock prefix may be prepended to instructions including the following kind where the destination operand is a memory operand: ADD (add), ADC (add with carry), AND (logical and), BTC (bit test and complement), BTR (bit test and reset), BTS (bit test and set), CMPXCHG (compare and exchange), CMPXCH8B (compare and exchange 8 bytes), DEC (decrement), INC (increment), NEG (two's complement negation), NOT (one's complement negation), OR (logical or), SBB (integer subtraction with borrow), SUB (subtract), XOR (exclusive or), XADD (exchange and add), and XCHG (exchange memory with register). When it may be imperative that no other processor or thread change the value of the destination memory location between the parts of the read-modify-write functionality specified by these instructions, the lock prefix may be used to make the parts atomic (appearing to be one single part).

In one embodiment, a lock instruction may be decoded into several micro-operations, including a "load_with_store_intent_lock" micro-operation and a "store_unlock" micro-operation. Other micro-operations may be present for the various instructions mentioned in the paragraph above. For ease of discussion, we may refer to the load_with_store_intent_lock micro-operation as a "load_with_lock" micro-operation and write it load_lock. The load_lock micro-operation would initiate the lock condition when it entered the execution unit 112. The store_unlock micro-operation would remove the lock condition when it issued from the MOB 122.

Previous embodiments would not issue a load_lock micro-operation until two conditions were satisfied. The first condition was that all previous instructions in original program order must have executed and been retired. In other words, the load_lock micro-operation should be the oldest micro-operation in the ROB 108. The second condition was that any previously-pending store micro-operations in the MOB 122 must have completed and the store buffers associated with the MOB 122 must have drained (in other words, all the store operations must have written their data into the memory system). These two conditions are not compatible with out-of-order execution.

It has been noticed that the lock instruction was frequently not strictly necessary. In a substantial percentage of cases, the memory location or cache line remained uncontended during the period of the lock: that is, no other processor or threads attempted to access the particular memory location or cache line under the lock, and no other processor event threatened that memory location's integrity. Therefore, processor 100 further includes a lock contention predictor 118 and monitor logic 116. The lock contention predictor 118 may issue predictions of whether or not a particular lock instruction will be contended during the lock period. If the prediction is that the particular lock instruction will in fact be contended, then the previous execution method for the lock instruction may be followed.

However, if the prediction is that the particular lock instruction will in fact not be contended, then it may be possible to proceed with a speculatively-issued normal load micro-operation and monitor the concerned memory location with the monitor logic 116 to determine whether any contended indications arise. Thus, we may not actually lock the memory location while performing the read-modify-write parts of the instruction to enforce atomicity, but instead perform the parts separately while watching for conditions that would indicate that another processor or thread may have broken the perception of atomicity. Such contended indications may include a snoop to the cache line that includes the target address of the load instruction, an interrupt, or if the subsequent store_unlock micro-operation misses in a cache. The monitor logic 116 may in some embodiments monitor several existing logic signals present within the processor. If no contended indications arise during the period of time representing an equivalent locked condition, then the speculatively-issued normal load micro-operation may retire normally. This may permit out-of-order execution of the lock instruction and enhance processor performance. However, if contended indications do arise, the pipeline may have to be flushed and the lock instruction re-executed. During this re-execution the lock instruction may be executed non-speculatively as in a conventional implementation to aid in forward progress. In another embodiment, the processor may try to execute the lock instruction speculatively several times, detecting contention in each, prior to executing the instruction non-speculatively. When the processor executes the instruction non-speculatively (as in a conventional implementation), it may assert a signal or employ some procedure that prevents any other thread (or processor) from accessing the memory location in question. This may ensure that the processor can complete the execution and retire the lock instruction without any subsequent restarts. If, after a fixed number of speculative execution attempts, the processor does not revert to a non-speculative execution, it may be the case that the processor encounters a contended indication in every execution and is repeatedly forced to restart the lock instruction, thus inhibiting forward progress.

The lock contention predictor 118 may utilize circuitry and theory of operation of one of the numerous well-known branch predictors, including those of the local predictors and, alternatively, of the global predictors. In one embodiment, the lock contention predictor 118 may be a table for storing a linear instruction pointer for those lock instructions which have in the past been found to be contended. In one embodiment, the table may be empty upon processor initialization, and all lock instructions may be presumed to be not contended. When a prediction of a given lock instruction is found to be false, then that lock instruction's linear instruction pointer may be written into the table for future use.

When lock contention predictor 118 predicts that a given lock instruction will not be contended, then the scheduler 110 may issue the corresponding load_lock micro-operation speculatively from ROB 108. In one embodiment, the corresponding load_lock micro-operation may be issued from ROB 108 as a speculative load_without_lock micro-operation. Either kind of load micro-operation may then generate a request for ownership of the corresponding cache line, which may in some embodiments initiate the cache line transitioning to a exclusive "E" state (in caches using the modified/exclusive/shared/invalid "MESI" cache coherency protocol). If the load micro-operation misses in the lowest cache, then a fill buffer may be allocated and the load may "sleep" as a pending operation in the MOB 122.

If the load_lock micro-operation hits in the cache, or when a sleeping load_lock micro-operation is woken up in the MOB 122 by the corresponding cache-line fill, the following may occur. In some embodiments, it might be necessary to prevent the cache line containing the lock variable from being replaced between the execution of the load_lock and the retirement of the store_unlock. In one embodiment, a bit can be set in the tag of the cacheline to prevent replacement, but to still allow snoops as required by the memory ordering protocols. However, it is possible for a set of these speculative load_locks to execute prior to an older load, thus consuming all of the ways in a cache set. This leaves no way in the set for an older load to fill its data from the next level cache, thus the retirement of the older load is prevented because it cannot complete. The speculative load_locks cannot retire because they are not the oldest; thus we have a deadlock. To prevent this scenario, a load_lock may issue speculatively only if there are enough unlocked ways in the set in order to leave at least some available for an older instruction. If there are not enough unlocked ways, then the load_lock is issued only when all previous instructions have retired (as in the conventional implementation). In one embodiment, there must be at least 2 available ways for a speculative load_lock to issue.

Whether a load_lock micro-operation or a load_without_lock micro-operation is issued from the ROB 108, the corresponding store_unlock micro-operations and any intervening micro-operations, may issue from the ROB 108 either before or after the load micro-operation. However, the store_unlock micro-operation may stay pending in the MOB 122 until the load micro-operation, and any intervening micro-operations, are at the point of retirement, at which point the MOB 122 may then issue the store_unlock micro-operation.

The load micro-operation and corresponding store_unlock micro-operation would not be permitted to retire if the monitor logic 116 determined that a contended indication took place. This would mean that the prediction that the lock instruction will not be contended was false. The period of time in which this contended indication would be considered may vary in differing embodiments. In one embodiment, the period of time may end when the memory store (corresponding to the store_unlock) becomes globally observable. Here "globally observable" may mean that all agents in the cache coherency domain will see this latest value of the memory location. In another embodiment, the period of time may end when the store_unlock becomes the oldest store in the MOB 122. In this second embodiment, an actual lock condition may be needed for the brief period of time between the time when the store_unlock becomes the oldest store in the MOB 122 and the time the store_unlock becomes globally observable.

In previous implementations, the store_unlock micro-operation would be the oldest non-retired micro-operation in ROB 108 when the memory store became globally observable. However in one embodiment the store_unlock micro-operation would not be the oldest non-retired micro-operation in ROB 108 when the memory store became globally observable, because the load (with or without lock) micro-operation would not retire until the memory store became globally observable. Therefore the load would be the oldest non-retired micro-operation in the machine.

In another embodiment, the lock contention predictor 118 may be omitted. Instead, it may be presumed in all cases that lock instructions will not be contended. The corresponding load micro-operations may in each case initially be speculatively executed. In those cases where the lock instructions turn out to be actually contended, the monitor logic 116 may detect a contended indication and restart the execution pipeline. Only those lock instructions which have caused a contended indication may then be re-executed in a non-speculative manner.

In another embodiment, the monitor logic 116 may be omitted. In this embodiment, the cache system may include logic to reject snoops directed to the address of interest to a lock instruction. This may preserve the integrity of the contents at the address of interest without a formal lock being invoked. The other agent which had generated the snoop may take the rejection of its snoop as an indication to try the snoop again a short time later.

Figure 2:
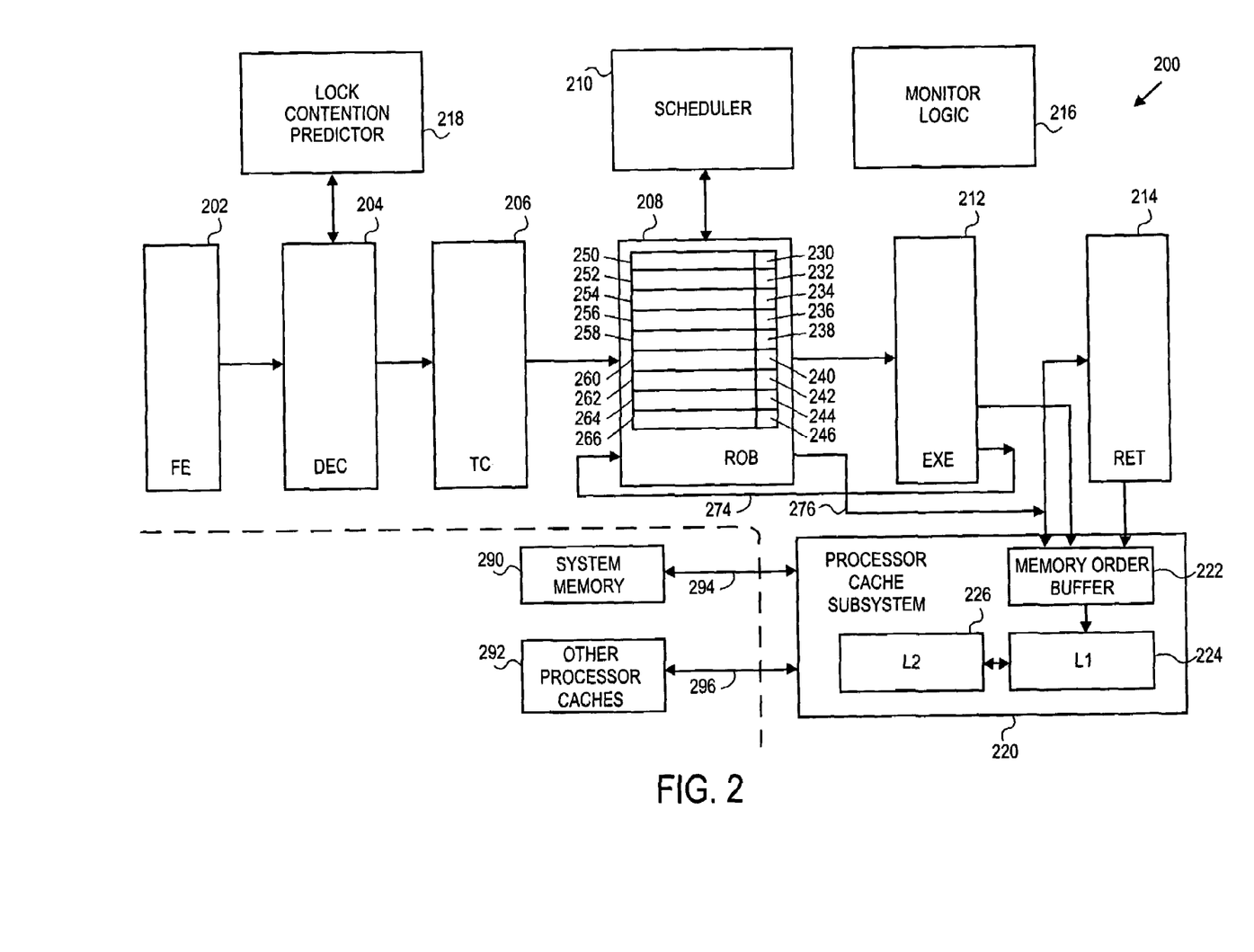
FIG. 2 is a schematic diagram of a processor and its execution pipeline showing a lock contention predictor operating near the beginning of the pipeline, according to one embodiment.

Referring now to FIG. 2, a schematic diagram of a processor and its execution pipeline showing a lock contention predictor operating near the beginning of the pipeline is shown, according to one embodiment. Many of the circuits shown in FIG. 2 may be similar to those of FIG. 1, but the lock contention predictor 218 may instead be used to modify the operation of the decode stage 204. Rather than always decoding the lock instruction into a load_lock micro-operation and a store_unlock micro-operation, when the lock contention predictor 218 determines that the lock instruction will not be contended the decode stage 204 may decode the lock instruction into micro-operations including a regular load micro-operation and a store_unlock micro-operation. The regular load micro-operation may in some embodiments appear as a load_lock micro-operation with a hint or other status bit appended. These micro-operations may then be used to build a trace in trace cache 206. In other embodiments, the micro-operations may be temporarily stored in another form of buffer.

Monitor logic 216 may perform a similar function to that performed by monitor logic 116 of FIG. 1. Again, the load micro-operation and corresponding store_unlock micro-operation would not be permitted to retire if the monitor logic 216 determined that a contended indication occurred. This would mean that the prediction that the lock instruction will not be contended was false. The period of time in which this contended indication would be considered may vary in differing embodiments. In one embodiment, the period of time may end when the memory store (corresponding to the store_unlock) becomes globally observable. In another embodiment, the period of time may end when the store_unlock becomes the oldest store in the MOB 222.

If a contended indication is determined, the recovery process may be different than that discussed in connection with FIG. 1 above. The lock instruction upon restart may not be able to re-issue from the trace cache 206 because the trace cache 206 may contain a trace with load_without_lock micro-operation. The lock instruction would have to be decoded once again in the decode stage 204, this time decoding into micro-operations including a load_lock micro-operation and a corresponding store_unlock micro-operation. These micro-operations may require a new trace be constructed in trace cache 206.

Figure 3:
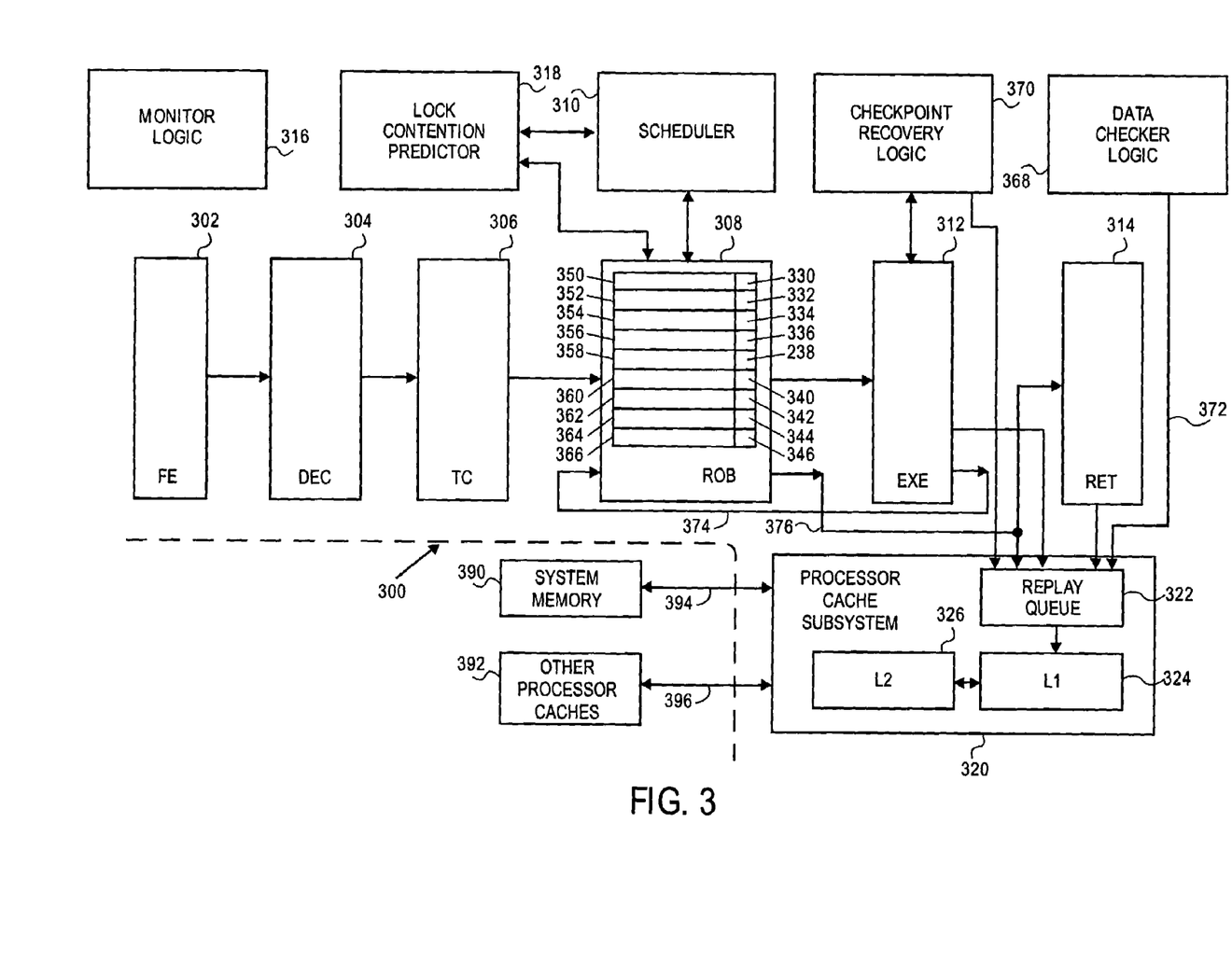
FIG. 3 is a schematic diagram of a processor and its execution pipeline showing a lock contention predictor operating near the end of the pipeline, according to one embodiment.

Referring now to FIG. 3, a schematic diagram of a processor and its execution pipeline showing a lock contention predictor operating near the end of the pipeline is shown, according to one embodiment. The FIG. 3 embodiment includes a modified MOB, designated a replay queue 322, to support replay operations in a Pentium® 4 compatible processor. Replay operations may repair incorrect data speculation by re-executing speculatively-issued micro-operations until the data speculation becomes correct. In one embodiment, the load_lock and store_unlock micro-operations may be replayed if the monitor logic 316 indicates contention without flushing the pipeline or restarting the lock instruction.

In another embodiment, a checkpoint repair may be performed using a checkpoint recovery logic 370. In one embodiment, the checkpoint recovery logic 370 may store a snapshot of the processor state when all micro-operations prior to the load_lock micro-operation have retired. After the checkpoint is taken, all constituent micro-operations of the speculatively executed lock instruction and, in some embodiments, any subsequent instructions in the program may retire in order, when they are complete. If the monitor logic 316 indicates contention before the memory store (corresponding to the store_unlock) is globally observable, indicating the processor pipeline may have to be flushed, then the processor state at the retirement of the micro-operation immediately prior to the load_lock is restored (from the checkpoint recovery logic 370). The load_lock, store_unlock, and any other constituent micro-operations of the lock instruction may be re-executed. During this re-execution, the constituent micro-operations maybe treated as in a conventional implementation, and may be executed non-speculatively. The checkpoint recovery logic 370 may in other embodiments be used in other processors, such as the processors shown in FIGS. 1 and 2 above.

In one embodiment, when lock contention predictor 318 determines that a lock instruction will be not contended, the load_lock micro-operation or a load_without_lock micro-operation may be speculatively issued from the ROB 308. Whether a load_lock micro-operation or a load_without_lock micro-operation is issued from the ROB 308, the corresponding store_unlock micro-operations, and any intervening micro-operations, may issue from the ROB 308 either before or after the load micro-operation. In cases where incorrect data speculation creates a bad address, one or more data checker logic 368 may issue an invalid address signal 372 to the replay queue 322. The invalid address signal 372 may be used in conjunction with the monitor logic 316 to determine the processing of the speculative load micro-operation and corresponding store_unlock micro-operation.

When the invalid address signal 372 is FALSE and the monitor logic 316 does not detect a contended indication, the load micro-operation and store_unlock micro-operation may retire normally. When the invalid address signal 372 is FALSE and the monitor logic 316 does detect a contended indication, the pipeline may be flushed and the lock instruction restarted. In another embodiment, if the monitor logic 316 detects a contended indication, the load micro-operation may be replayed. However, when the invalid address signal 372 is TRUE, the status of the monitor logic 316 may be irrelevant as any contended indications may be with respect to an incorrect address. Thus when the invalid address signal 372 is TRUE, replay occurs and any contended indications from monitor logic 316 do not update the lock contention predictor 318.

Figure 4:
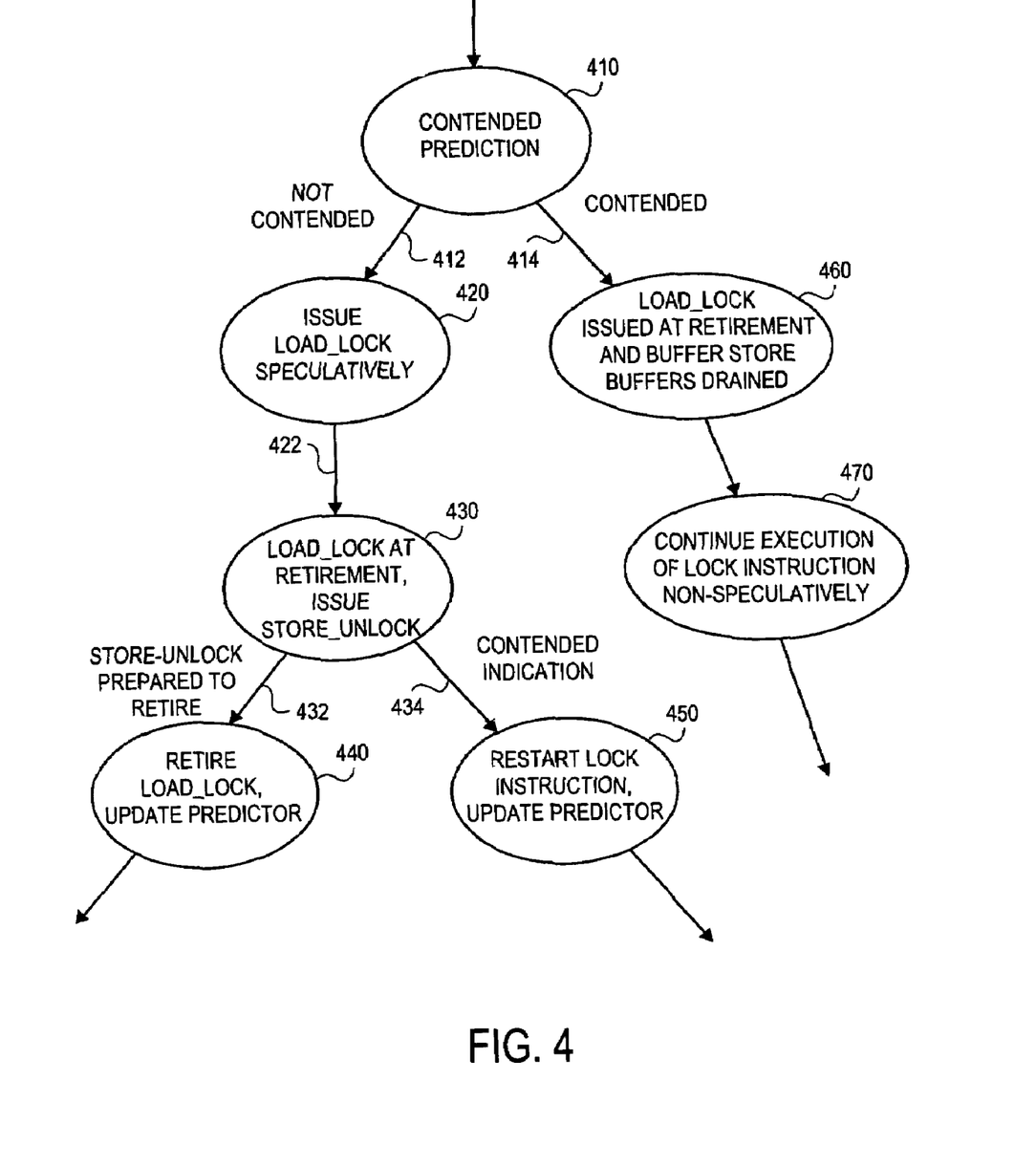
FIG. 4 is a state diagram of the execution of a lock instruction, according to one embodiment of the present disclosure.

Referring now to FIG. 4, a state diagram of the execution of a lock instruction is shown, according to one embodiment of the present disclosure. In block 410, the prediction whether the lock instruction will be contended or not contended is made. If the prediction is that it will be contended, then the process exits along the contended path 414 and enters block 460. In block 460 the load_lock micro-operation is issued to the memory system at retirement, and only after all pending store buffers have drained. Then in block 470 the other micro-operations of the lock instructions are normally executed in a non-speculative manner.

If the prediction made in block 410 is that the lock instruction will not be contended, then the process exits along the not contended path 412 and the load_lock micro-operation (or in some embodiments the load_lock micro-operation appended with some hints that the lock operation may be uncontended, or in some embodiments the load_lock micro-operation morphed into some new micro-operation such as load_with_uncontended_lock micro-operation or load_without_lock micro-operation) may be speculatively issued for execution. Then, in block 430, when the load_lock micro-operation is at retirement, the store_unlock micro-operation may be issued to memory. The store_unlock micro-operation may then prepare for retirement. In one embodiment the store_unlock micro-operation is prepared to retire when the memory store becomes globally observable. This also permits the load_lock micro-operation to retire. In another embodiment, the store_unlock micro-operation is prepared to retire when the memory store becomes the oldest pending store micro-operation in a memory ordering buffer. In turn, this permits the load_lock micro-operation to retire.

If the store_unlock micro-operation is prepared to retire (which in one embodiment may be when it becomes globally observable) without any contended indications, then the process exits along path 432 and in block 440 the load_lock micro-operation retires, and the prediction logic is updated with a TRUE prediction result. However, if contended indications arise before the store_unlock micro-operation is prepared to retire, then the process exits along path 434 and in block 450 the lock instruction is restarted, and the prediction logic is updated with a FALSE prediction result. During this re-execution the lock instruction may be executed non-speculatively as in a conventional implementation to aid in forward progress.

In another embodiment, blocks 410, 460, and 470 may be omitted. Instead, it may be presumed in all cases that lock instructions will not be contended. The corresponding load micro-operations may in each case initially be speculatively executed (block 420). In those cases where the lock instructions turn out to be actually contended, the monitor logic 160 may detect a contended indication, flush the execution pipeline, and restart the lock instruction (block 450). Only those lock instructions which have caused a contended indication may then be re-executed in a non-speculative manner.

Figure 5A:
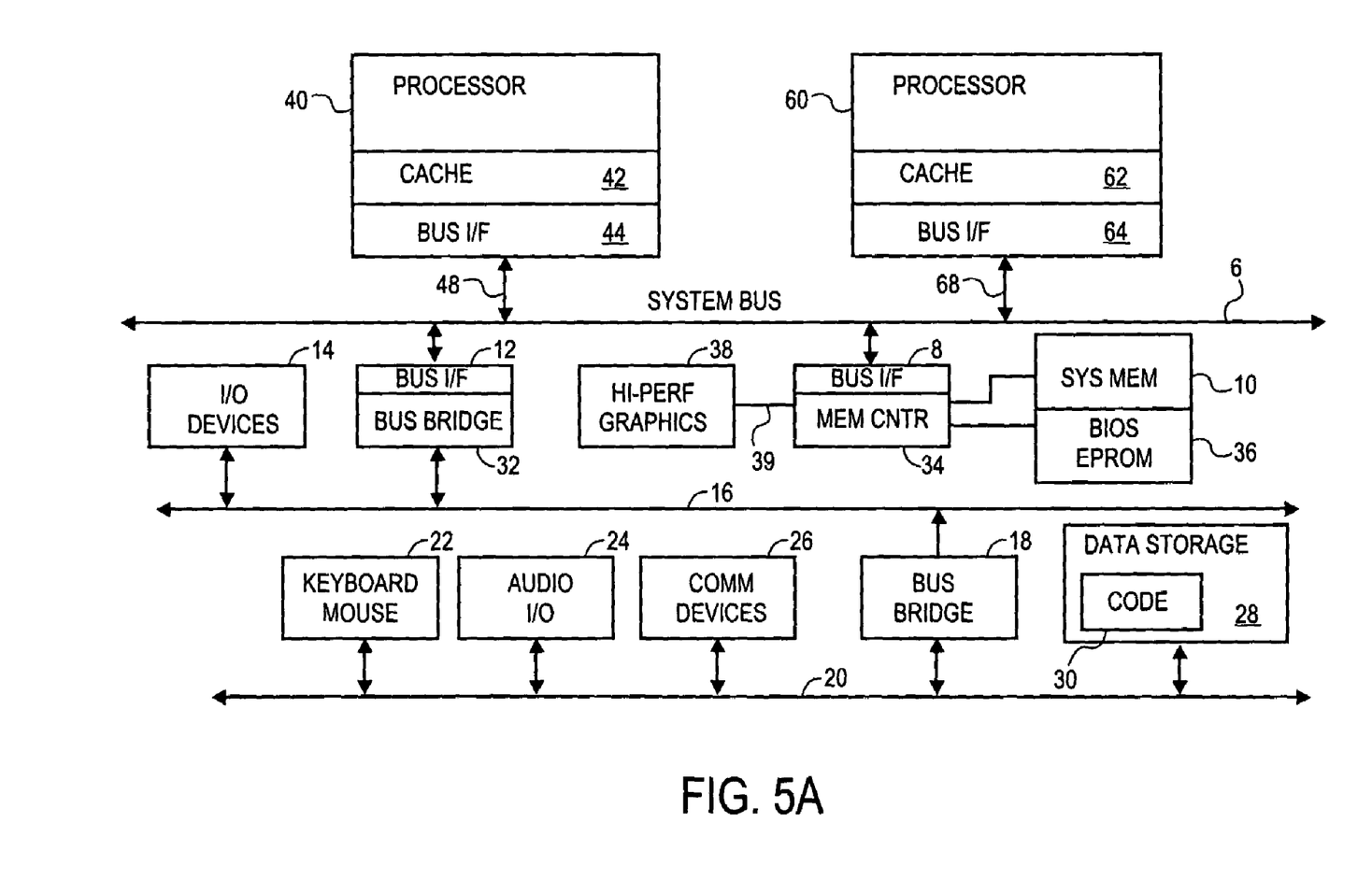
FIGS. 5A and 5B are schematic diagrams of systems including processors supporting a lock contention predictor for speculative execution of lock instructions, according to two embodiments of the present disclosure.
Figure 5B:
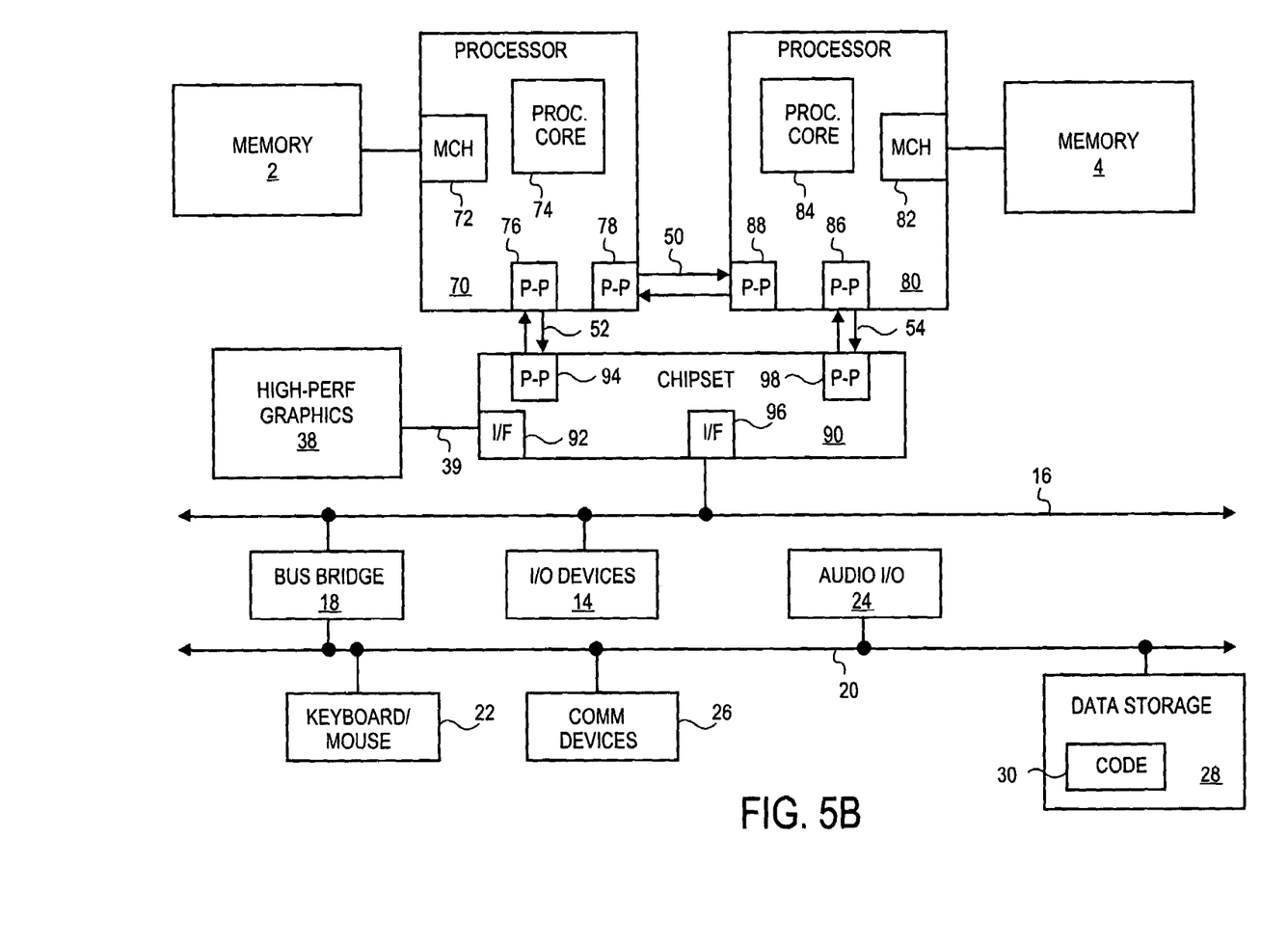

Referring now to FIGS. 5A and 5B, schematic diagrams of systems including a processor supporting a lock contention predictor and monitor logic are shown, according to two embodiments of the present disclosure. The FIG. 5A system generally shows a system where processors, memory, and input/output devices are interconnected by a system bus, whereas the FIG. 5B system generally shows a system where processors, memory, and input/output devices are interconnected by a number of point-to-point interfaces.

The FIG. 5A system may include several processors, of which only two, processors 40, 60 are shown for clarity. Processors 40, 60 may include level one caches 42, 62. The FIG. 5A system may have several functions connected via bus interfaces 44, 64, 12, 8 with a system bus 6. In one embodiment, system bus 6 may be the front side bus (FSB) utilized with Pentium® class microprocessors manufactured by Intel® Corporation. In other embodiments, other busses may be used. In some embodiments memory controller 34 and bus bridge 32 may collectively be referred to as a chipset. In some embodiments, functions of a chipset may be divided among physical chips differently than as shown in the FIG. 5A embodiment.

Memory controller 34 may permit processors 40, 60 to read and write from system memory 10 and from a basic input/output system (BIOS) erasable programmable read-only memory (EPROM) 36. In some embodiments BIOS EPROM 36 may utilize flash memory. Memory controller 34 may include a bus interface 8 to permit memory read and write data to be carried to and from bus agents on system bus 6. Memory controller 34 may also connect with a high-performance graphics circuit 38 across a high-performance graphics interface 39. In certain embodiments the high-performance graphics interface 39 may be an advanced graphics port AGP interface. Memory controller 34 may direct data from system memory 10 to the high-performance graphics circuit 38 across high-performance graphics interface 39.

The FIG. 5B system may also include several processors, of which only two, processors 70, 80 are shown for clarity. Processors 70, 80 may each include a local memory controller hub (MCH) 72, 82 to connect with memory 2, 4. Processors 70, 80 may exchange data via a point-to-point interface 50 using point-to-point interface circuits 78, 88. Processors 70, 80 may each exchange data with a chipset 90 via individual point-to-point interfaces 52, 54 using point to point interface circuits 76, 94, 86, 98. Chipset 90 may also exchange data with a high-performance graphics circuit 38 via a high-performance graphics interface 92.

In the FIG. 5A system, bus bridge 32 may permit data exchanges between system bus 6 and bus 16, which may in some embodiments be a industry standard architecture (ISA) bus or a peripheral component interconnect (PCI) bus. In the FIG. 5B system, chipset 90 may exchange data with a bus 16 via a bus interface 96. In either system, there may be various input/output I/O devices 14 on the bus 16, including in some embodiments low performance graphics controllers, video controllers, and networking controllers. Another bus bridge 18 may in some embodiments be used to permit data exchanges between bus 16 and bus 20. Bus 20 may in some embodiments be a small computer system interface (SCSI) bus, an integrated drive electronics (IDE) bus, or a universal serial bus (USB) bus. Additional I/O devices may be connected with bus 20. These may include keyboard and cursor control devices 22, including mice, audio I/O 24, communications devices 26, including modems and network interfaces, and data storage devices 28. Software code 30 may be stored on data storage device 28. In some embodiments, data storage device 28 may be a fixed magnetic disk, a floppy disk drive, an optical disk drive, a magneto-optical disk drive, a magnetic tape, or non-volatile memory including flash memory.

In the foregoing specification, the invention has been described with reference to specific embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A processor, comprising:
   a predictor to issue a prediction whether a lock instruction is contended;
   a scheduler to issue a set of micro-operations corresponding to said lock instruction speculatively when said prediction is that said lock instruction is not contended; and
   monitor logic to determine if a contended indication occurs, wherein said contended indication is when a store with unlock micro-operation misses in a cache and said processor restarts processing of said lock instruction when said monitor logic determines that a contended indication occurs.

2. The processor of claim 1, wherein said scheduler issues a load_with_lock micro-operation as a load_without_lock micro-operation.

3. The processor of claim 1, wherein said contended indication is an interrupt.

4. The processor of claim 1, wherein said monitor logic to determine said contended indication before said store with unlock micro-operation becomes an oldest non-retired store micro-operation.

5. The processor of claim 1, wherein said monitor logic to determine said contended indication before result of said store with unlock micro-operation becomes globally observable.

6. The processor of claim 1, further comprising a snoop reject logic to reject snoops to the target address of said lock instruction.

7. A processor, comprising:
   a predictor to issue a prediction whether a lock instruction is contended;
   a decoder to decode said lock instruction into a load_without_lock micro-operation and a store micro-operation; and
   monitor logic to determine if a contended indication occurs, wherein said contended indication is when said store micro operation misses in a cache.

8. The processor of claim 7, wherein said contended indication is an interrupt.

9. The processor of claim 7, wherein said monitor logic to determine said contended indication before said store micro-operation becomes an oldest non-retired store micro-operation.

10. The processor of claim 7, wherein said monitor logic to determine said contended indication before result of said store becomes globally observable.

11. A method, comprising:
    predicting whether a lock instruction will be contended;
    issuing a load_without_lock micro-operation corresponding to said lock instruction when said predicting predicts that said lock instruction will not be contended;
    monitoring for a contended indication; and restarting execution of said lock instruction when said monitoring detects a contended indication, wherein said contended indication is when a store with unlock micro-operation misses in a cache.

12. The method of claim 11, wherein said contended indication is an interrupt.

13. The method of claim 11, wherein said issuing includes sending said load_without_lock micro-operation from a buffer.

14. The method of claim 13, wherein said load_without_lock micro-operation was stored as a load_with_lock micro-operation in said buffer.

15. The method of claim 11, wherein said issuing includes decoding said load_without_lock micro-operation from said lock instruction.

16. An apparatus, comprising:
 means for predicting whether a lock instruction will be contended;
 means for issuing a load_without_lock micro-operation corresponding to said lock instruction when said predicting predicts that said lock instruction will not be contended; and
 means for monitoring for a contended indication, wherein said contended indication is when a store with unlock micro-operation misses in a cache.

17. The apparatus of claim 16, further comprising means for restarting execution of said lock instruction when said monitoring detects a contended indication.

18. The apparatus of claim 16, wherein said means for issuing includes means for sending said load_without_lock micro-operation from a buffer.

19. The apparatus of claim 18, wherein said load_without_lock micro-operation was stored as a load_with_lock micro-operation in said buffer.

20. The apparatus of claim 16, wherein said means for issuing includes means for decoding said load_without_lock micro-operation from said lock instruction.

21. A system, comprising:
 a first processor including:
  a predictor to issue a prediction whether a lock instruction is contended, and
  a scheduler to issue a set of micro-operations corresponding to said lock instruction speculatively when said prediction is that said lock instruction is not contended; and
  monitor logic to determine if a contended indication occurs, wherein said contended indication is when a store with unlock micro-operation misses in a cache and said processor restarts processing of said lock instruction when said monitor logic determines that a contended indication occurs;
 a first interface to a second processor;
 a second interface to input/output devices; and
 an audio input-output device coupled to said second interface.

22. The system of claim 21, wherein said scheduler issues a load_with_lock micro-operation as a load_without_lock micro-operation.

23. The system of claim 21, wherein said monitor logic to determine said contended indication before said store with unlock micro-operation becomes an oldest non-retired store micro-operation.

24. The system of claim 21, wherein said monitor logic to determine said contended indication before result of said store with unlock micro-operation becomes globally observable.

25. A system, comprising:
 a first processor including:
  a predictor to issue a prediction whether a lock instruction is contended,
  a decoder to decode said lock instruction into a load_without_lock micro-operation and a store micro-operation, and
  monitor logic to determine if a contended indication occurs before said store micro-operation retires, wherein said contended indication is when a store with unlock micro-operation misses in a cache and said processor restarts processing of said lock instruction when said monitor logic determines that a contended indication occurs;
 a first interface to a second processor;
 a second interface to input/output devices; and
 an audio input-output device coupled to said second interface.

26. The system of claim 25, wherein said monitor logic to determine said contended indication before said store micro-operation becomes an oldest non-retired store micro-operation.

27. The system of claim 25, wherein said monitor logic to determine said contended indication before result of said store becomes globally observable.

28. A method, comprising:
 presuming initially a lock instruction will be not contended;
 issuing a load_without_lock micro-operation corresponding to said lock instruction; and
 monitoring for a contended indication; and
 restarting execution of said lock instruction when said monitoring detects a contended indication wherein said contended indication is when a store with unlock micro-operation misses in a cache.

29. The method of claim 28, wherein said issuing includes sending said load_without_lock micro-operation from a buffer.

30. The method of claim 29, wherein said load_without_lock micro-operation was stored as a load_with_lock micro-operation in said buffer.

31. The method of claim 28, wherein said issuing includes decoding said load_without_lock micro-operation from said lock instruction.

* * * * *